Patented June 15, 1948

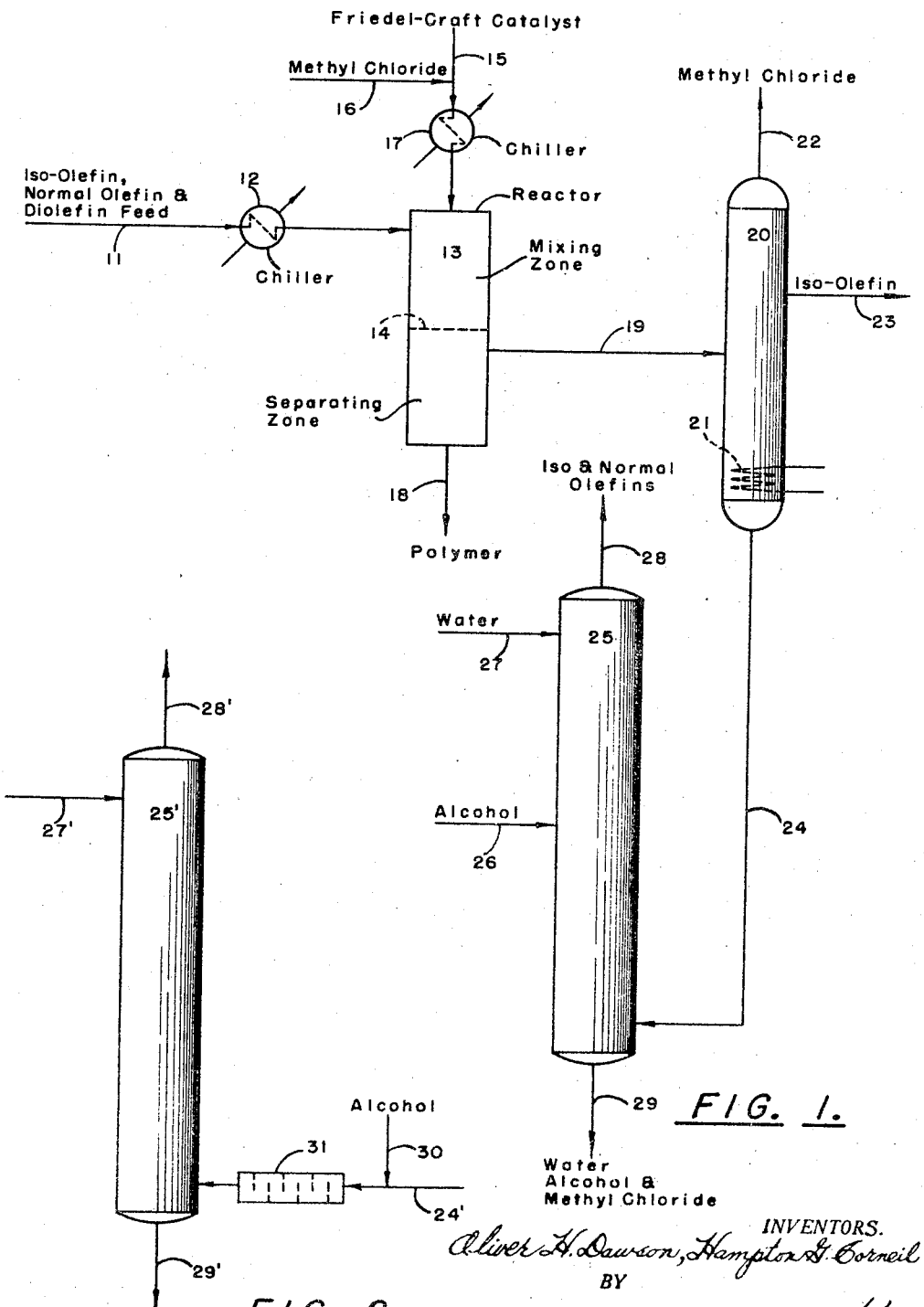

2,443,229

UNITED STATES PATENT OFFICE 2,443,229

EXTRACTION OF METHYL CHLORIDE FROM HYDROCARBONS

Oliver H. Dawson and Hampton G. Corneil, Baytown, Tex., assignors to Standard Oil Development Company, a corporation of Delaware Application July 13, 1945, Serial No. 604,832

6 Claims. (Cl. 260—677)

The present invention is directed to a method for treating a liquid fraction comprising a major portion of hydrocarbon and a minor portion of methyl chloride to remove at least the major portion of the methyl chloride from the hydrocarbon. The present invention is particularly directed to the treatment of mixtures of the type released in low temperature polymerization reactions used to produce rubber-like polymer and enables the valuable hydrocarbons present in these mixtures to be further processed and eliminates the rapid corrosion of equipment which has heretofore been encountered when treating such hydrocarbon materials.

The present invention may be described generally as involving the steps of bringing into intimate contact a feed stock comprising a major portion of hydrocarbons and a minor portion of methyl chloride with an alcohol having a substantial solubility in water to form an alcoholic solution of the feed stock. The alcoholic solution is then separated into a hydrocarbon fraction and an aqueous fraction by introducing water or an aqueous solution into the alcoholic solution, and gravity settling. The hydrocarbon fraction obtained is substantially free from methyl chloride and may be treated in additional steps, as for example distillation, thermal polymerization or dehydrogenation without causing the corrosion of equipment used for handling it which would result were not the methyl chloride previously removed from the hydrocarbon. The resultant aqueous phase may be further treated as desired to recover the alcohol and methyl chloride as such therefrom or to convert one or all of the constituents in the aqueous phase into other constituents and recover them.

In the practice of the present invention, it will be found that a number of alcohols are suitable for contacting with the hydrocarbon feed stock; specific materials which may be mentioned by way of example are tertiary butyl alcohol, propyl alcohol, ethyl alcohol or methyl alcohol. Because of the relative ease in recovering the tertiary butyl alcohol from aqueous solutions by distillation it will often be advantageous to employ this material in preference to other alcohols having the requisite solubility characteristics. In treating the hydrocarbon feed stock, the water soluble alcohol may be intimately contacted with the hydrocarbon feed stock to form a solution and water or an aqueous solution added to the alcoholic solution to cause a phase separation. Alternatively, a solution of alcohol in water may be intimately contacted with the hydrocarbon feed stock whereby the methyl chloride is extracted from the hydrocarbon feed stock and a phase separation obtained substantially simultaneously so that upon subjecting the admixture to gravity separation a hydrocarbon phase substantially free from methyl chloride and an aqueous phase containing at least a major portion of the methyl chloride originally present in the hydrocarbon feed stock is obtained. As a further modification of the present invention, an aqueous solution, such as an aqueous sodium hydroxide solution, may be employed instead of water for bringing about a phase separation in the hydrocarbon alcoholic solution.

The present invention will now be described in greater detail in conjunction with the drawing in which—

Fig. 1 is in the form of a diagrammatic flow sheet showing a polymerization process for producing a rubber-like polymer wherein a mixture of hydrocarbons and methyl chloride is obtained and wherein the mixture is treated to separate it into constituents, and Fig. 2 is in the form of a diagrammatic flow sheet showing a modification which may be substituted for an equivalent step in the process shown in Fig. 1.

Turning now specifically to the drawing and first to Fig. 1, a hydrocarbon feed stock including normal olefins, iso-olefin and diolefin is passed through line 11 containing chiller 12 and discharged into reactor 13. The reactor 13 is shown symbolically as a rectangle and is provided with a partition indicated by dotted line 14 as indicating a separation into an upper reaction or mixing zone and a lower separating zone. A Friedel-Craft type catalyst dissolved in methyl chloride is passed through inlet line 15 and has mixed therewith additional methyl chloride through inlet 16. The mixture of Friedel-Crafts type catalyst and methyl chloride then passes through chiller 17 and is discharged to the mixing zone of reactor 13. In reactor 13 the hydrocarbon feed stock reacts to form a rubber-like polymer; the rubber-like polymer is separated from the remaining constituents, and is removed through outlet line 18 while the remaining constituents are removed as vapors through line 19. It will be understood that the polymerization of olefinic material at low temperatures in the presence of a Friedel-Crafts type catalyst is well known to the art. A desirable method for obtaining such a reaction is by jetting a stream of the polymerizable hydrocarbon feed stock into free space and jetting the solution of Friedel-Crafts type catalyst into the hydrocarbon stream to cause its admixture with the polymerizable feed stock at low temperatures; a description of such a polymerization method is described in U. S. application Ser. No. 491,028, filed June 16, 1943, in the name of John D. Calfee, Robert M. Thomas and Paul J. Flory and, since this reaction as such does not form a part of the present invention, the reaction zone 13 and its operation will not be described in any greater detail in the present application.

The vaporous mixture withdrawn from reaction zone 13 through line 19 includes substantial amounts of normal olefins and iso-olefin and a minor amount of methyl chloride. This mixture is discharged through line 19 into an initial separating zone, such as a distillation column 20 provided with a heating coil 21. Although distillation column 20 is shown as a single unit, it will be understood that several distillation columns may be provided to accomplish the desired separation. In separating zone 20 the mixture fed thereto is separated into a low boiling methyl chloride fraction which may be removed as overhead through line 22 and one or more hydrocarbon fractions which are withdrawn through lines 23 and 24. A fraction comprising predominantly iso-olefin contaminated with methyl chloride is withdrawn through line 23 and may be recycled to feed line 11. A hydrocarbon fraction comprising predominantly iso- and normal olefins and contaminated with a minor portion of methyl chloride is withdrawn as a bottoms stream through outlet 24.

In the drawing, line 24 conveys the hydrocarbon fraction contaminated with methyl chloride into a lower portion of column 25. Column 25 is arranged to allow the intimate contacting of the hydrocarbon material with a water soluble alcohol and with water to allow the separation of two liquid phases, a hydrocarbon liquid phase and an aqueous liquid phase. Accordingly, an alcohol having substantial solubility in water is charged into a mid-point of column 25 through inlet 26. The alcohol in liquid state and the hydrocarbon fraction in liquid state are intimately contacted and form an alcoholic solution. Water is injected into an upper portion of the tower through inlet 27. The water flows downwardly in the tower and, upon commingling with the alcoholic solution, causes the formation of two phases, a hydrocarbon phase substantially free from methyl chloride and an aqueous phase including the water soluble alcohol and at least a major portion of the methyl chloride introduced into the tower through line 24. The aqueous phase is the heavier and flows downwardly in the tower while the hydrocarbon phase is the lighter and flows upwardly. The hydrocarbon phase comprises iso-olefins and normal olefins and is removed from the top of the tower as a liquid fraction through outlet 28. The aqueous phase is removed from the lower end of tower 25 through outlet 29.

The process shown in Fig. 1 may be modified as illustrated in Fig. 2. It will be understood that Fig. 2 shows only a portion of the complete process and is intended to be substituted for corresponding equipment shown in Fig. 1. In this figure, tower 25', inlet lines 24' and 27' and outlet lines 28' and 29' correspond to tower 25 and lines 24, 27, 28 and 29, respectively, of Fig. 1. The procedure of Fig. 2 differs from that of Fig. 1 in that the alcohol is admixed with the hydrocarbon fraction being charged to tower 25' rather than added directly to the tower. As will be seen, the alcohol is added through line 30 to the hydrocarbon stream passing through line 24' and the alcohol and hydrocarbon are thoroughly admixed by passing through mixing device 31 which may, for example, be an orifice type incorporator and the mixture subsequently discharged into tower 25'. It will be understood that tower 25' operates in the same manner as tower 25 with the solution of hydrocarbon and alcohol brought into contact with water to cause a phase separation and wherein a hydrocarbon fraction is removed through outlet 28' and an aqueous fraction is removed through outlet 29'.

As an example illustrating the application of the present invention, the hydrocarbon feed stock introduced by line 11 may be a mixture of isobutylene, normal butylenes and a poly-olefin, such as butadiene, isoprene, piperylene and the like, and this feed stock may be chilled to a temperature within the range of −150° F. to −100° F. The Friedel-Crafts type catalyst may be aluminum chloride dissolved in the methyl chloride and this catalyst solution may be similarly chilled to a low temperature and admixed with the chilled hydrocarbon feed stock in the reactor 13. In the reactor a rubber-like polymer is produced and is withdrawn through outlet 18, while a mixture comprising isobutylene, normal butylenes, and methyl chloride is withdrawn through line 19. In the initial separating zone 20 the mixture is separated into a methyl chloride fraction and an isobutylene fraction while a mixture of isobutylene rich in normal butylenes and contaminated with appreciable amounts of methyl chloride is withdrawn through line 24 and sent to vessel 25 where it is extracted to remove the methyl chloride from the hydrocarbons. The aqueous solution withdrawn from the bottom of the tower 25 comprises water, alcohol and methyl chloride. The hydrocarbon fraction withdrawn from the upper end of column 25 comprises isobutylene rich in normal butylenes and free from methyl chloride and this fraction may be further treated in means not shown to utilize these valuable constituents without danger of corroding the equipment employed.

In order to illustrate further the practice of the present invention, the following example is given.

*Example*

| Experiment No | 1 | 2 | 3 |
|---|---|---|---|
| Charge: | | | |
| Spent Butylene, cc | 1000 | 1000 | 1000. |
| Methyl Chloride, per cent | 0.55 | 0.55 | 0.55. |
| Treatment:[1] | | | |
| Extracted with 250 cc. of | 20% Alcohol in 2 N NaOH. | 20% Alcohol in 1 N NaOH. | 20% Alcohol in 1 N NaOH. |
| Extracted Butylene, per cent Methyl Chloride. | 0.07 | 0.055 | 0.06. |

| Experiment No | 4 | 5 | 6 |
|---|---|---|---|
| Charge: | | | |
| Spent Butylene, cc | 1000 | 1000 | 1000. |
| Methyl Chloride, per cent | 0.55 | 0.55 | 0.55. |
| Treatment:[1] | | | |
| Extracted with 250 cc. of | 20% Alcohol in water. | 20% Alcohol in water. | 33% Alcohol in water. |
| Extracted Butylene, per cent Methyl Chloride. | 0.12 | 0.16 | 0.02. |

[1] The alcohol used was tertiary butyl alcohol and each alcohol extraction was followed by three 250 cc. water washes.

It will be seen from the above table that the methyl chloride was removed from the hydrocarbon in amounts ranging from 71% to 95%.

While we have given specific examples illustrating the practice of the present invention, it is to be understood that such examples are for illustrative purposes only. It will be obvious to a worker skilled in the art that various modifications may be made in the practice described above without departing from the scope of the invention.

Having fully described and illustrated the present invention, what we desire to claim is:

1. A method for treating a hydrocarbon mixture comprising a major portion of butylene and having dissolved therein appreciable amounts of methyl chloride including the steps of intimately contacting said mixture in a liquid state with an alcohol having substantial solubility in water to form a solution in said alcohol, intimately contacting the alcoholic solution with water in sufficient amount to cause a separation of a hydrocarbon phase and an aqueous phase, and separately removing said phases.

2. A method for treating a feed stock comprising a major portion of butylenes and an appreciable amount of methyl chloride including the steps of bringing the feed stock in a liquid state into intimate contact with a water soluble alcohol to form a solution, intimately contacting said solution with an aqueous solution of sodium hydroxide and forming an aqueous phase including at least the major portion of the methyl chloride originally present in the feed stock and a hydrocarbon phase and separately removing said phases.

3. A method for treating a feed stock comprising methyl chloride in an amount of the order of 0.5% and a major portion of butylene including the steps of contacting the feed stock in a liquid state with an alcohol having substantial water solubility to form an alcoholic solution, contacting the solution with water and forming a butylene phase including no more than a minor portion of the methyl chloride initially present in the feed stock and an aqueous phase including at least a major portion of said methyl chloride intially present in the feed stock and separately removing said phases.

4. A method in accordance with claim 3 in which the alcohol is tertiary butyl alcohol.

5. A method of treating a feed stock comprising methyl chloride in an amount of the order of 0.5% and a major portion of butylenes including the steps of intimately contacting the feed stock in a liquid state with an alcohol having substantial water solubility to form a solution, intimately contacting said solution with an aqueous solution of sodium hydroxide to form an aqueous phase including at least a major portion of methyl chloride initially present in the feed stock and a butylenes phase including no more than a minor portion of the methyl chloride initially present in the feed stock and separately removing said phases.

6. A method in accordance with claim 5 in which the alcohol is tertiary butyl alcohol.

OLIVER H. DAWSON.
HAMPTON G. CORNEIL.

REFERENCES CITED

The following references are of record in the file of this patent:

UNITED STATES PATENTS

| Number | Name | Date |
|---|---|---|
| 2,402,978 | Allen, Jr., et al. | July 2, 1946 |

OTHER REFERENCES

Jones et al., Chlorination of Natural Gas, Tech. Paper 255, Dept. of the Interior, Bureau of Mines, pages 35–38 (1921).

Handbook of Chemistry and Physics, 26th ed., Pub. by Chem. Rubber Pub. Co., Cleveland, Ohio, pages 880–881, 872, 873, 660, 661, 665, 664 (1942).

Allison et al., Jour. Ind. Eng. Chem., vol. 11, 943–6 (1919).